(12) United States Patent
Brown et al.

(10) Patent No.: US 7,626,279 B2
(45) Date of Patent: Dec. 1, 2009

(54) METHOD AND APPARATUS FOR ENERGY HARVESTING USING ROTATIONAL ENERGY STORAGE AND RELEASE

(75) Inventors: Stuart B. Brown, Needham, MA (US); Brian S. Hendrickson, Boston, MA (US)

(73) Assignee: Veryst Engineering LLC, Needham, MA (US)

( * ) Notice: Subject to any disclaimer, the term of this patent is extended or adjusted under 35 U.S.C. 154(b) by 0 days.

(21) Appl. No.: 11/952,244

(22) Filed: Dec. 7, 2007

(65) Prior Publication Data

US 2008/0164702 A1 Jul. 10, 2008

Related U.S. Application Data

(60) Provisional application No. 60/879,146, filed on Jan. 8, 2007, provisional application No. 60/943,380, filed on Jun. 12, 2007, provisional application No. 60/975,410, filed on Sep. 26, 2007.

(51) Int. Cl.
*F02B 63/04* (2006.01)
*F03G 7/08* (2006.01)
*H02K 7/18* (2006.01)

(52) U.S. Cl. .................................... 290/1 R
(58) Field of Classification Search .............. 290/1 R
See application file for complete search history.

(56) References Cited

U.S. PATENT DOCUMENTS

| 250,104 | A | | 11/1881 | Roberts | 60/505 |
|---|---|---|---|---|---|
| 1,314,147 | A | * | 8/1919 | Osborn | 417/331 |
| 1,667,152 | A | * | 4/1928 | Hegge | 185/30 |
| 3,536,929 | A | | 10/1970 | Parker | 290/52 |
| 3,675,031 | A | | 7/1972 | Lavigne | 290/1 R |
| 3,800,212 | A | * | 3/1974 | Branco et al. | 322/28 |
| 3,898,471 | A | | 8/1975 | Schera, Jr. | 290/42 |
| 3,930,168 | A | | 12/1975 | Tornabene | 290/53 |
| 3,964,264 | A | | 6/1976 | Tornabene | 405/76 |
| 4,145,885 | A | | 3/1979 | Solell | 60/504 |
| 4,232,230 | A | | 11/1980 | Ames | 290/53 |
| 4,239,975 | A | | 12/1980 | Chiappetti | 290/1 R |
| 4,399,368 | A | | 8/1983 | Bucknam | 290/1 R |
| 4,409,489 | A | | 10/1983 | Hayes | 290/1 R |
| 4,410,805 | A | | 10/1983 | Berley | 290/1 R |
| 4,418,286 | A | * | 11/1983 | Scott | 290/42 |

(Continued)

OTHER PUBLICATIONS

Mendez et al., "Putting it in Scale—Order and Magnitude Scaling," Mechanical Engineering Design (2004).

(Continued)

*Primary Examiner*—Nicholas Ponomarenko
*Assistant Examiner*—Pedro J Cuevas
(74) *Attorney, Agent, or Firm*—David C. Brezina; Ladas & Parry LLP

(57) ABSTRACT

An energy harvester is provided for converting an input force into electrical energy and also allowing for energy to be stored and then released at a later time. The energy harvester includes a receiver, energy collector, converter, and holder, and operates in three stages. The receiver receives the input force and the energy collector is moved by the receiver with an input displacement. The energy collector is then held in a catch position. The input force changes direction, and the energy collector is released by the holder and moves with an output displacement that is different from the input displacement. The converter generates electrical energy from the motion created.

16 Claims, 9 Drawing Sheets

U.S. PATENT DOCUMENTS

| | | | |
|---|---|---|---|
| 4,434,374 A | 2/1984 | Lundgren | 290/1 R |
| 4,454,426 A | 6/1984 | Benson | 290/1 R |
| 4,473,751 A | 9/1984 | Rombach et al. | 290/1 R |
| 4,511,805 A | 4/1985 | Boy-Marcotte et al. | 290/2 |
| 4,614,875 A | 9/1986 | McGee | 290/1 R |
| 4,672,222 A | 6/1987 | Ames | 290/53 |
| 4,739,179 A | 4/1988 | Stites | 290/1 R |
| 5,347,186 A | 9/1994 | Konotchick | 310/17 |
| 5,495,682 A | 3/1996 | Chen | 36/2.6 |
| 5,578,877 A | 11/1996 | Tiemann | 310/15 |
| 5,684,761 A | 11/1997 | Chen et al. | 368/204 |
| 5,880,532 A * | 3/1999 | Stopher | 290/1 E |
| 5,929,531 A * | 7/1999 | Lagno | 290/1 R |
| 5,982,577 A * | 11/1999 | Brown et al. | 360/96.3 |
| 6,091,159 A | 7/2000 | Galich | 290/1 R |
| 6,172,426 B1 | 1/2001 | Galich | 290/1 R |
| 6,220,719 B1 | 4/2001 | Vetorino et al. | 362/192 |
| 6,236,118 B1 * | 5/2001 | Vasija et al. | 290/1 E |
| 6,281,594 B1 | 8/2001 | Sarich | 290/1 R |
| 6,291,901 B1 | 9/2001 | Cefo | 290/1 R |
| 6,376,925 B1 | 4/2002 | Galich | 290/1 R |
| 6,407,484 B1 | 6/2002 | Oliver et al. | 310/339 |
| 6,433,465 B1 | 8/2002 | McKnight et al. | 310/339 |
| 6,655,035 B2 | 12/2003 | Ghandi et al. | 310/339 |
| 6,734,575 B2 | 5/2004 | Ricketts | 290/1 R |
| 6,767,161 B1 | 7/2004 | Calvo et al. | 404/71 |
| 6,809,427 B2 | 10/2004 | Cheung et al. | 290/1 R |
| 6,812,583 B2 | 11/2004 | Cueung et al. | 290/1 R |
| 6,949,840 B2 | 9/2005 | Ricketts | 290/1 R |
| 6,982,497 B2 | 1/2006 | Rome | 290/1 A |
| 7,009,350 B1 * | 3/2006 | Gold | 318/142 |
| 7,023,104 B2 | 4/2006 | Kobashikawa et al. | 290/42 |
| 7,045,912 B2 * | 5/2006 | Leijon et al. | 290/42 |
| 7,057,330 B2 | 6/2006 | Buhler et al. | 310/339 |
| 7,102,244 B2 | 9/2006 | Hunter, Jr. | 290/1 R |
| 7,145,257 B2 | 12/2006 | Ricketts | 290/1 R |
| 7,205,732 B1 | 4/2007 | Gold | 318/142 |
| 7,231,874 B2 | 6/2007 | Rastegar et al. | 102/207 |
| 7,239,031 B2 | 7/2007 | Ricketts | 290/1 R |
| 7,285,868 B2 | 10/2007 | Wilson | 290/1 R |
| 7,304,398 B1 * | 12/2007 | Kim et al. | 290/1 E |
| 7,345,372 B2 | 3/2008 | Roberts et al. | 290/1 R |
| 7,352,073 B2 | 4/2008 | Ames | 290/42 |
| 7,365,445 B2 | 4/2008 | Burclk | 290/53 |
| 2003/0034652 A1 | 2/2003 | Slatkin | 290/1 R |
| 2003/0132637 A1 | 7/2003 | Ricketts | 290/1 R |
| 2003/0155771 A1 | 8/2003 | Cheung et al. | 290/1 R |
| 2004/0066041 A1 | 4/2004 | Hunter, Jr. | 290/1 R |
| 2004/0100100 A1 | 5/2004 | Wilson | 290/1 R |
| 2004/0183306 A1 | 9/2004 | Rome | 290/1 R |
| 2005/0001430 A1 | 1/2005 | Ricketts | 290/1 R |
| 2005/0230973 A1 | 10/2005 | Fripp et al. | 290/1 R |
| 2005/0230974 A1 | 10/2005 | Masters et al. | 290/1 R |
| 2006/0001267 A1 | 1/2006 | Ricketts | 290/1 R |
| 2006/0006653 A1 | 1/2006 | Ricketts | 290/1 R |
| 2006/0192386 A1 | 8/2006 | Rome | 290/1 R |
| 2007/0007770 A1 | 1/2007 | Jager et al. | 290/1 R |
| 2007/0085342 A1 | 4/2007 | Horlanopoulos et al. | 290/1 R |
| 2007/0210580 A1 | 9/2007 | Roberts et al. | 290/1 R |
| 2008/0164701 A1 * | 7/2008 | Brown et al. | 290/1 E |
| 2009/0152990 A1 * | 6/2009 | Brown et al. | 310/339 |

OTHER PUBLICATIONS

Poulin et al., "Generation of electrical energy for portable devices. Comparative study of an electromagnetic and piezoelectric system," Sensor and Actuators, A116 (2004).

Thompson, "Electrodynamic Magnetic Suspension—Models, Scaling Laws and Experimental Results," IEEE Transactions and Education, vol. 43, No. 3 (2000).

* cited by examiner

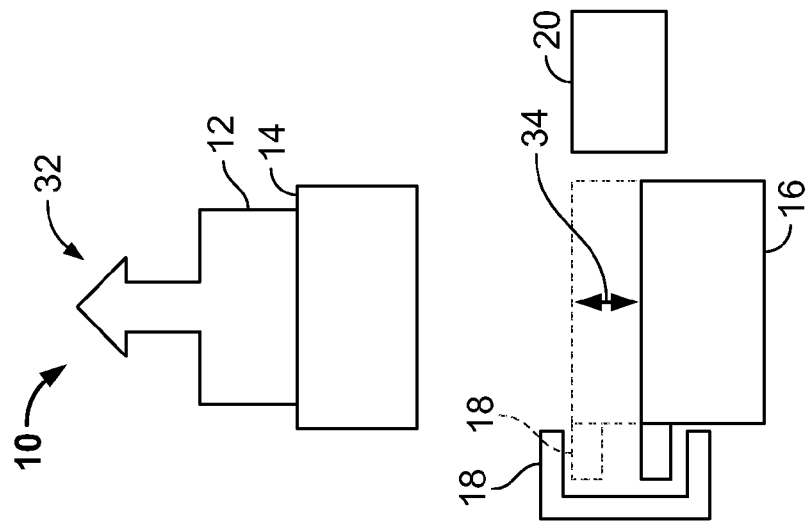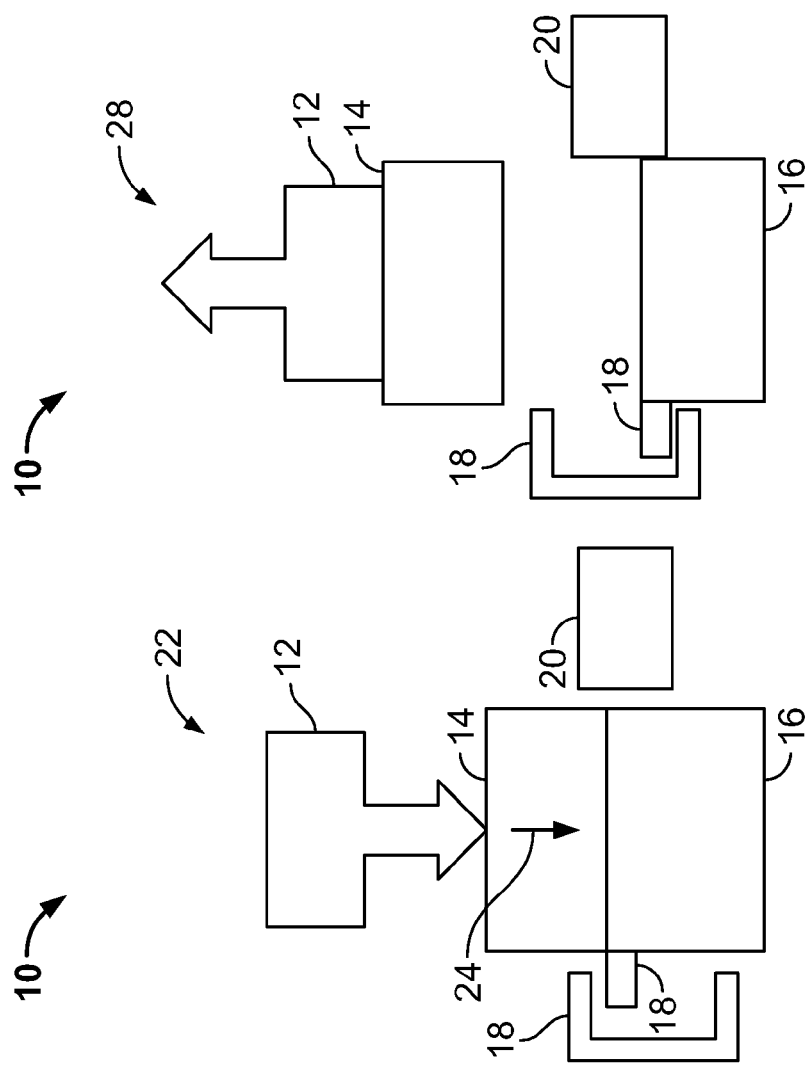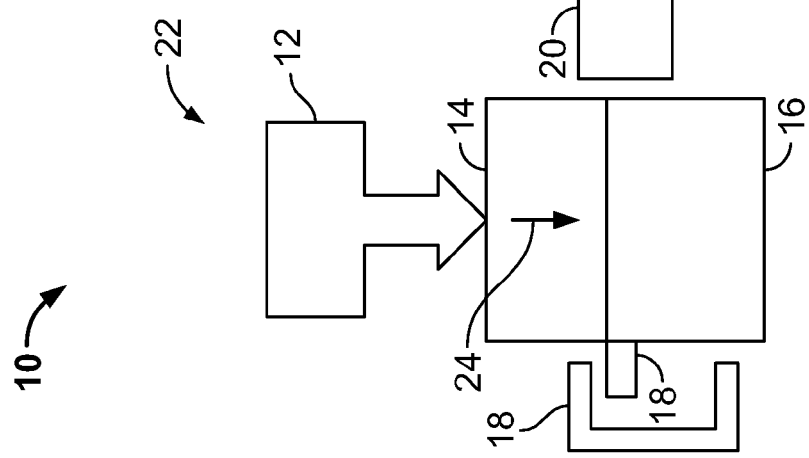

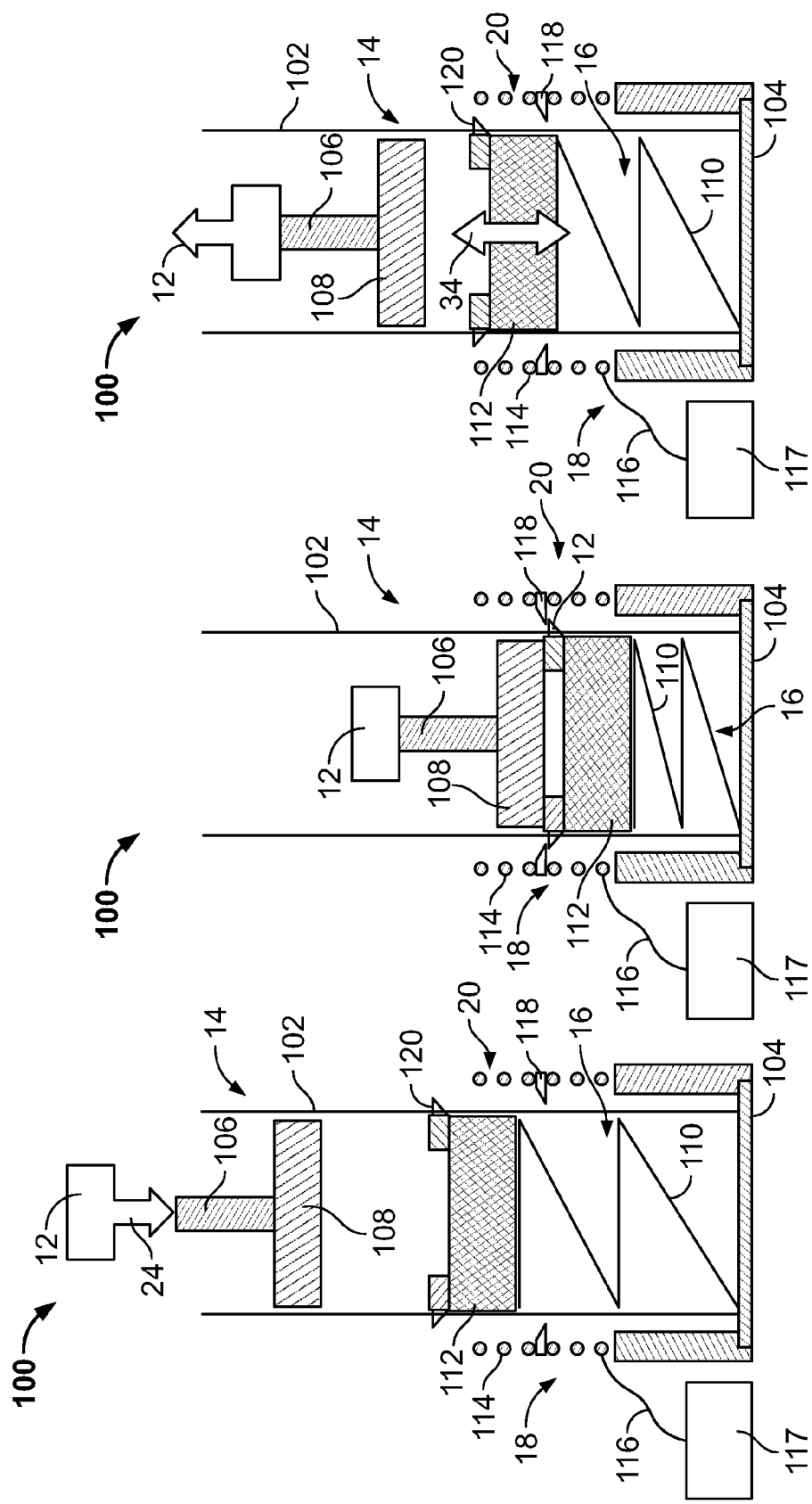

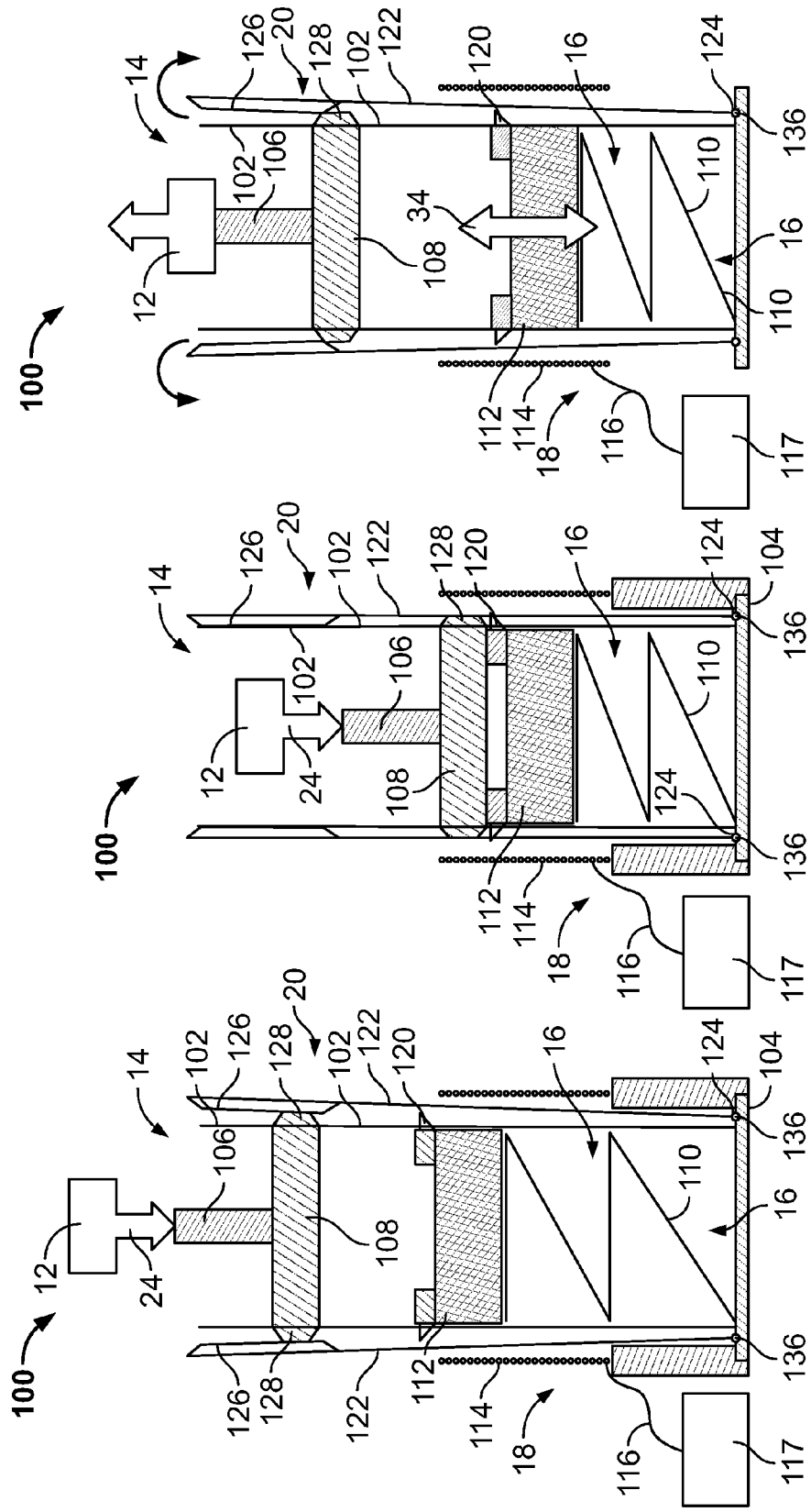

METHOD AND APPARATUS FOR ENERGY HARVESTING USING ROTATIONAL ENERGY STORAGE AND RELEASE

CROSS-REFERENCE TO RELATED APPLICATIONS

This application is a non-provisional application claiming priority to Provisional Application No. 60/879,146 filed Jan. 8, 2007 which is herein incorporated by reference, Provisional Application No. 60/943,380 filed Jun. 12, 2007 which is herein incorporated by reference, and Provisional Application No. 60/975,410 filed on Sep. 26, 2007 which is also herein incorporated by reference.

FIELD OF THE INVENTION

This disclosed invention pertains to energy harvesting mechanisms.

BACKGROUND OF THE INVENTION

The present disclosure generally relates to a device for creating electrical energy from mechanical motion.

SUMMARY OF THE INVENTION

The present disclosure involves transforming low frequency excitation into high frequencies for producing electricity and harvesting energy. An energy collector is deformed with an input displacement, then captured, and then released to allow the energy collector to move with an output displacement. The output displacement is either faster or has a higher frequency, or both, than the input displacement. The energy collector is coupled to a power converter such as a magnetic induction device, piezoelectric material, or an electrorestrictive material to create electricity from the motion of the energy collector.

BRIEF DESCRIPTION OF THE DRAWINGS

FIG. 1 is a fundamental representation of a energy harvester during an input stage showing an input force pushing down a receiver;

FIG. 2 is a fundamental representation of the energy harvester from FIG. 1 during a hold stage showing a holder capturing the energy collector;

FIG. 3 is a fundamental representation of the energy harvester from FIG. 1 during a output stage showing the energy collector released from the holder;

FIG. 5 is a cross-sectional side view of a linear harvester, showing an input force pushing down a receiver;

FIG. 6 is a cross-sectional side view of the linear harvester from FIG. 5, showing the input force pushing down the receiver, storing energy in an energy collector, and engaging a holder;

FIG. 7 is a cross-sectional side view of the linear harvester from FIG. 5, showing the input force retreating and pulling up the receiver and showing the holder released and the energy collector moving with an output displacement;

FIG. 8 is a cross-sectional side view of a specific linear harvester, showing the input force pushing down on the receiver and showing the receiver pushing out on pivot arms of the holder;

FIG. 9 is a cross-sectional side view of the linear harvester from FIG. 8, showing the input force pushing down the receiver and storing energy in the energy collector and showing the receiver no longer pushing out on pivot arms of the holder so that the holder can engage;

FIG. 10 is a cross-sectional side view of the linear harvester from FIG. 8, showing the input force retreating and pulling up the receiver and showing the receiver pushing out on pivot arms of the holder, thereby releasing the holder, and showing the energy collector moving with the output displacement;

DETAILED DESCRIPTION OF THE DRAWINGS

Figure 4:
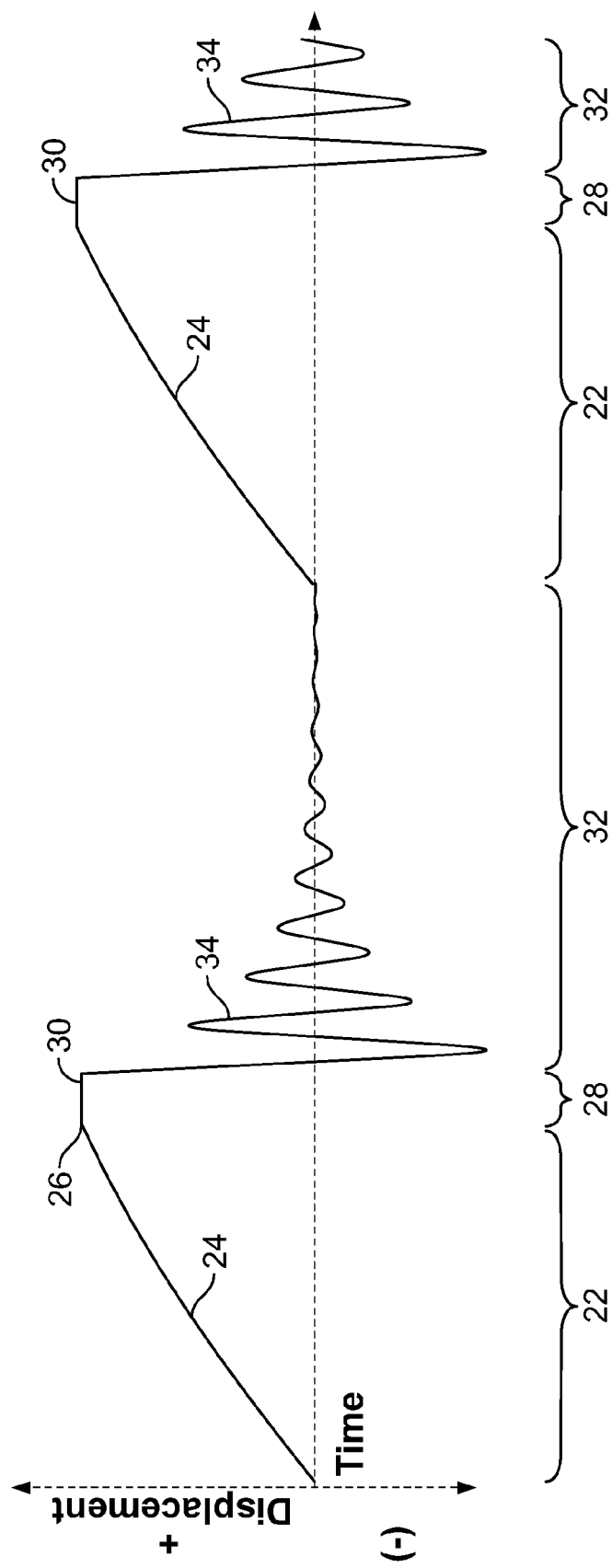
FIG. 4 is a graphical representation showing displacement of the energy collector over time, including an input displacement during the input stage, a constant displacement during the hold stage, and a output displacement during the output stage, and showing the cycle repeating.
Figure 11:
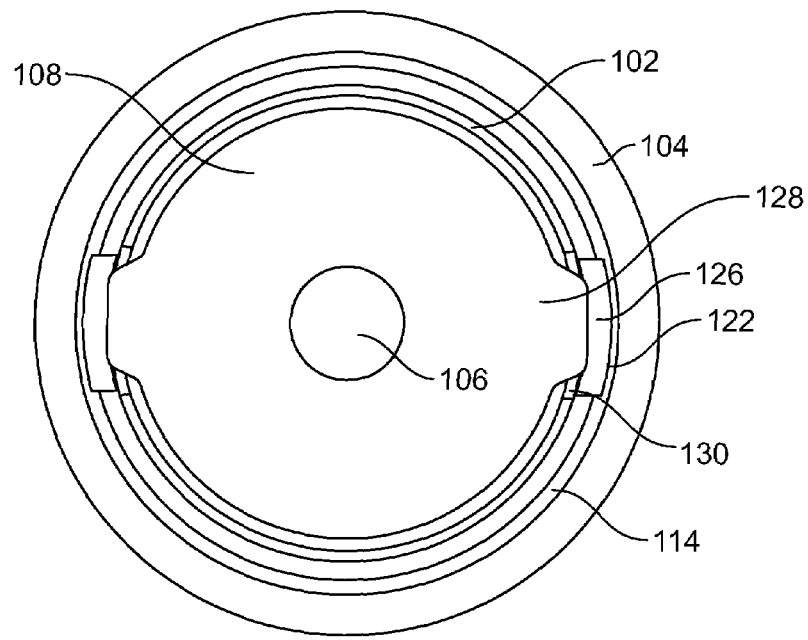
FIG. 11 is a top view of the linear harvester from FIG. 8.

An energy harvester 10 is provided for converting an input force 12 into electrical energy and also allowing for energy to be stored and then released at a later time. Energy harvesting, also known as energy scavenging, uses displacement or input force 12 to convert some or all of that motion into usable energy.

FIGS. 1-3 show a fundamental embodiment of energy harvester 10. The energy harvester 10 is shown to include a receiver 14, an energy storage structure or energy collector 16, converter 18, and a catch-and-release mechanism or holder 20. The energy harvester 10 operates in three stages. First is the excitation stage or input stage 22, second is the hold stage 28, and third is the energy conversion or output stage 32.

The input stage 22 is shown in FIG. 1. The receiver 14 receives the input force 12 and the energy collector 16 is moved by the receiver 14 with an input displacement 24.

FIG. 2 shows the second or hold stage 28. The receiver 14 moves away as the input force 12 changes. The energy collector 16 is held in the latched or catch position 26 by the holder 20 and has a constant displacement 30, as seen in FIG. 4.

FIG. 3 shows the third or output stage 32. Once the receiver 14 has moved away and the input force 12 has changed state to a sufficient distance, the energy collector 16 is unlatched or released by the holder 20 and moves with an output displacement 34. The converter 18 generates electrical energy from the motion created during the output stage 32.

FIG. 4 provides a graphical representation of the energy collector's 16 displacement over time during the input stage 22, hold stage 28, and output stage 32. During the input stage 22, the energy collector moves with the input displacement 24 to the catch position 26. In one embodiment, the rate of displacement during the input displacement 24 is constant and in another embodiment the rate varies. Next, during the hold stage 28, the energy collector 16 is held in the catch position 26 with a constant displacement 30. The duration of the hold stage 28 can vary. In one embodiment, the duration of the hold stage 28 is greater than 10 microseconds.

Finally, during the output stage 32, the energy collector 16 oscillates or vibrates over time, with the output displacement 34. The speed, amplitude, and possibly frequency of the displacement of the energy collector 16 during the output displacement 34 decreases over time. In one embodiment, the frequency during the output displacement 34 does not decrease and only the amplitude does. The average speed of the output displacement 34 may or may not be greater than the average speed during the input displacement 24. The top speed of the output displacement 34, however, is greater than the input displacement 24. The frequency of the output displacement 34 is also greater than the input displacement 24. In another embodiment, the output displacement 34 is damped, and thereby resonates within approximately +/−50% of the undamped frequency or in another embodiment within approximately +/−25% of the undamped frequency. The three stages repeat for as long as the input force 12 is applied.

Input force 12 is any means for displacing the receiver 14 and energy collector 16 during the input stage 22. This input force 12 can involve any motion or force, whether machine, natural, human, or animal. The input force 12 can be vibration, waves, walking, pressurized gases or fluids, wind, water flow, walking, running, swinging arms, tidal motion, physiological rhythms (e.g., heart beats), swaying structures, etc.

The input force 12 and motion created can be linear, upward, downward, rotational, vibrational, horizontal, vertical, single direction, mixed direction, or mixed. The input force 12 and motion created can involve an oscillating linear motion, oscillating rotational motion, continuous linear motion, or continuous rotation motions. Conventional mechanisms can be used to create any needed motion from the input force 12. The input force 12 can be captured by an ocean buoy, tidal machine, strike pad, windmill, water vane, vane, moving water paddle wheel, geothermal pressure source, or other device.

The receiver 14 is any structure receiving the input force 12 and displacing the energy collector 16. The receiver 14 can be a linear plunger, rotating wheel, cam, hydraulic piston, lever, pawl, linkage, eccentric wheel, screw, cylinder with an irregular shape, or other structure achieving the function described above. The displacement of the energy collector 16 can be linear, rotational, angular, or a combination thereof.

The energy collector 16 is any device capable of receiving and storing energy. In various embodiments, the energy collector 16 can be a linear spring, non-linear spring, constant force spring, laminated spring, leaf spring, tension spring, compressible elastic material, elastic cord, torsion spring, flexure springs, a chamber of gas or fluid that is compressed, other predominantly resilient or nondissipative structure, or a combination thereof.

Design calculations can be used to increase the power output of the energy collector 16. Adjustments can be made to the spring constant, spring linearity, mass of the moving system, magnet field strength, piezoelectric material properties, piezoelectric material dimensions, number of turns of an induction coil, load impedance, actuation displacement, actuation force, generator characteristics, damping coefficients, and system natural and peak frequencies, along with other design parameters.

Energy collector 16 can be made from a wide range of materials. The springs 110 and 206, for example, may comprise stainless steel, corrosion resistant steel, heat resistant steel, nickel alloy, cobalt alloy, copper alloy, composite, ceramic, polymer or a combination thereof.

Energy collectors 16 range in size depending on the application. For example, if ocean wave motion is utilized as the input force 12, one embodiment would require a spring as the energy collector 16 with a length and/or width of between approximately 0.1-100 centimeters or 0.001-1 meters. In another example, if a foot strike is utilized as the input force 12, one embodiment would require a spring as the energy collector 16 with a length and/or width of approximately between 0.01-50 millimeters. Embodiments that utilize a foot strike as the input force 12 must fit inside the sole of a shoe. In another aspect, the spring thickness is between approximately 0.02 millimeters to 1 centimeter.

In other embodiments, the energy collector 16 can comprise gas chambers that allow gas to be compressed at a low speed and then released to re-expand at a much higher speed. Energy collectors 16, such as gas chambers, can be of variable geometries and therefore tailored to different applications.

The input and output profiles 24 and 34 can have a variety of different speeds, frequencies, displacements, motions, accelerations, decelerations, etc. In one embodiment, the energy harvester 10 converts input force 12 motions with relatively low frequency or low velocity—in the range of 1 to 10 cycles per second (Hertz). The input displacement 24 involves lower frequencies and speeds than the output displacement. Walking and running, for example, occur at 1 to 2 Hertz. Breathing and wave motion occur at less than 1 Hertz. Typical heart rates are slightly more than 1 Hertz. Vigorous shaking of an object generally occurs at only a few Hertz.

In one embodiment, the ratio of the average speed of the input displacement 24 to the average speed of the output displacement 34 is greater than 1:10, 1:20, 1:50, or greater than 1:100. Similarly, the ratio of the frequency of the input displacement 24 to the frequency of the output displacement 34 is greater than 1:10, 1:20, 1:50, or greater than 1:100.

The methods and devices of the energy harvester 10 take advantage of energy collectors 16 that, after releasing stored energy, vibrate or move naturally at a high frequency or velocity, and therefore produce more power than if they were to only move at the frequency or velocity of the displacement used to deflect them. For example, the springs of the various spring/magnet embodiments described in this application are released quickly and may vibrate at 10 to 100 Hertz or greater, even though the forced deflection of the springs is only 1 or 2 Hertz. The high ratio of output to input permits the use of smaller and more lightweight components, e.g., smaller springs, magnets and coils.

The converter 18 is a magnetic induction device (e.g., generator or motor), piezoelectric material, or an electrorestrictive material. Magnets used in the converter 18 can comprise neodymium iron boron, samarium cobalt, alnico, ceramic or ferrite or combinations thereof. The magnets can be round bars, rectangular bars, horseshoes, rings or donuts, discs, rectangles, multi-fingered rings, and other custom shapes and have a wide range of sizes. In one embodiment, the present invention utilizes a foot strike as an input force 12 and the magnet used is between approximate 1 millimeter to 2 centimeters in length and width.

The wire coil of the converter 18 can be formed of insulated copper magnet wire with a wire gauge of between approximately 15 and 50. One of ordinary skill in the art knows how to optimize the wire coil and magnet for the desired application by selecting an appropriate wire gauge and coil geometry. The converter's 18 wire coil can be in a proximity location relative to the magnet so that the produced voltage is maximized. In one embodiment, the dimensions of the coil are approximately 2 centimeters long, with approximately 1 centimeter inside diameter and 1.5 centimeters outside diameter.

In another embodiment, converter 18 can be a generator or electric motor used as a generator. The motor can be driven by coupling it to the motion of the energy collector 16. This motion produces electric power in the generator or motor which can then used directly or stored within an energy storage component such as a battery or capacitor. Possible generators or motors include but are not limited to brushless DC and AC motors, linear induction, and DC and AC motors with brushes.

The holder 20 is any device that catches and releases the energy collector 16 at the proper time. The holder 20 can be a catch and release mechanism or other device that captures the energy collector 16 and then allows the energy collector 16 to be released after the receiver 14 and input force 12 have moved a sufficient distance or ceased storing more energy in the energy collector 16.

The present disclosure provides for two embodiments of energy harvester 10. The first embodiment or linear harvester 100 is for an energy collector 16 that is based on linear movements and is seen in FIGS. 5-13. The second embodiment or rotational harvester 200 is for an energy collector 16 that is based on rotational movements and is seen in FIGS. 14-21. In both embodiments the energy collector 16 is displaced at an input displacement 24 during the input stage 22, is then held in the catch position 26 during the hold stage 28, and then released and moves with an output displacement 34 during the output stage 32, as shown in FIGS. 1-4.

The linear harvester 100 is shown in a basic form in FIGS. 5-7 and is shown in a specific embodiment in FIGS. 8-13. One of ordinary skill in the art can appreciate that many other embodiments are possible in accordance with the present disclosure. The receiver 14 of the linear harvester 100 includes a guide 102, a base 104, an input arm 106, and an input plunger 108. The guide 102 is connected to the base 104. The guide 102 is a cylindrical structure or other shaped structure within which the receiver 14 travels and that houses the energy collector 16.

The input arm 106 extends inside the guide 102. One end of the input arm 106 interacts with the input force 12 and the other end is coupled to the input plunger 108. The connection between the input arm 106 and input plunger 108 can be a rigid or pivotal connection. The pivotal connection can be used to account for different force vectors contained in the input force 12.

The linear harvester's 100 energy collector 16 comprises a linear spring 110. The converter 18 is shown to include a magnet 112, coil 114, circuit 116, and an electrical energy storage device 117. The magnet 112 is attached to the top of the energy collector 16. The coil 114 is supported by the base 104 and is positioned around the magnet 112 and the circuit 116 is electronically connected to the coil 114, which is connected to the electrical energy storage device 117. The electrical energy storage device 117 can include power conditioning electronics and can include a capacitor, battery, or other device capable of receiving, storing, and releasing electric energy.

The linear harvester's 100 holder 20 includes catches 118 and latches 120. The catches 118 are connected to or formed within the coil 114 or other structure surrounding the guides 102. The latches 120 are attached to the top surface of the magnet 112 and extend beyond the edge of the magnet 112, beyond the guide 102, to interact with the catches 118. In other embodiments the latches 120 are attached to the bottom of the magnet 112, another portion of the magnet 112, the linear spring 110, or any other structure attached thereto.

Various embodiments of the holder 20 are possible that temporarily hold the energy collector 16 for a set period of time or movement of receiver 14 or input force 12. In one embodiment, the holder 20 responds to the position or direction of motion of the input arm 106 or input plunger 108. The distance between the catches 118 and the latches 120 can be varied to maximize the energy stored in the linear spring 110.

In another embodiment, the holder 20 components are electronically controlled, receiving input from sensors measuring the position and strength of input force 12, to maximize efficiency. The catches 118 or latches 120 can also include a retraction mechanism. The retraction mechanism can be a spring biased device or other conventional device to retract the catch 118 or latch 120 when the input force 12 is applied.

During the input stage 22, as seen in FIG. 5, the input force 12 pushes downward on the input arm 106 and plunger 108. The plunger pushes down on the latch 120, magnet 112, and linear spring 110. The energy collector 16 and magnet 112 move with the input displacement 24 seen in FIG. 4. As seen in FIG. 6, the input force continues to push until the latch 120 is underneath the catch 118.

Next, is the hold stage 28. The input force 12 changes states or reverses direction. Meanwhile, the energy collector 16 and magnet 112 are held in the catch position 26 with a constant displacement 30, as seen in FIG. 6. Accordingly, linear spring 110 is held compressed and stores energy.

Once the receiver 14 has moved sufficiently away, the output stage 32 begins. The latches 118 are released from the catches 120 and the linear spring 110 is accordingly released, as seen in FIG. 7. The linear spring 110 moves and vibrates with the output displacement 34 as seen in FIG. 4. The magnet 112 moves with the linear spring 110 and electricity is produced in the coils 114 through magnetic induction. The circuit 116 delivers the electricity to power conditioning electronics included in the electric energy storage device 117 or to an electricity-consuming device or power grid.

Figure 12:
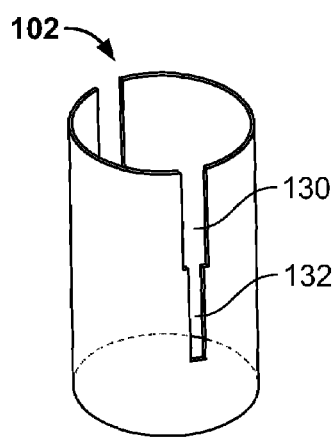
FIG. 12 is a perspective view of a guide of the linear harvester from FIG. 8, showing the guide to include input slots and latch slots.

FIGS. 8-13 show a specific embodiment of the linear harvester 100. The holder 20 is shown to include pivot arms 122 attached to the base 104 by pivots 124. Ramps 126 are attached at the top of the pivot arms 122 extending to the inside. The input plunger 108 includes tongues 128 on either side. As seen in FIG. 12, the guide 102 includes tongue slots 130 and latch slots 132. Tongues 128 extend into and travel within tongue slot 130. Latches 120 extend into and travel within a lower portion of tongue slots 130 and latch slots 132 located beneath the tongue slots 130.

Figure 13:
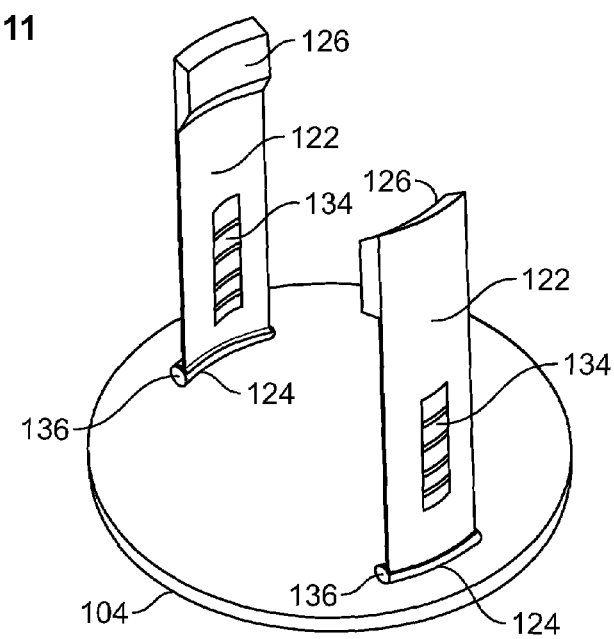
FIG. 13 is a perspective view of the holder of the linear harvester from FIG. 8 attached to a base and showing the holder to include laddered openings.

The catches 118 comprise laddered openings 134 vertically arranged towards the bottom position of the pivot arms 122, as seen in FIG. 13. The pivot arms 122 are biased in an upright direction by torsion springs 136 in the pivots 124. The pivot arms 122 can also be biased by springs connected to the guide 102 or by another conventional means. In another embodiment, the pivot arms 122 are themselves elastic. Structures can also be added to the pivot arms 122 for added support.

During the input stage 22, latch 120 enters ladder openings 134 as the receiver 14 is moved downward. These multiple ladder openings 134 account for different distances of travel by the receiver 14 while maximizing the amount of energy stored. During the hold stage, tongues 128 make contact with the ramps 126, causing the pivot arms 122 to pivot outward. When the pivot arms 122 pivot outward, the ladder openings 134 are moved away from the latches 120 and the linear spring 110 is accordingly released and vibrates, as seen in FIG. 10.

Figure 14:
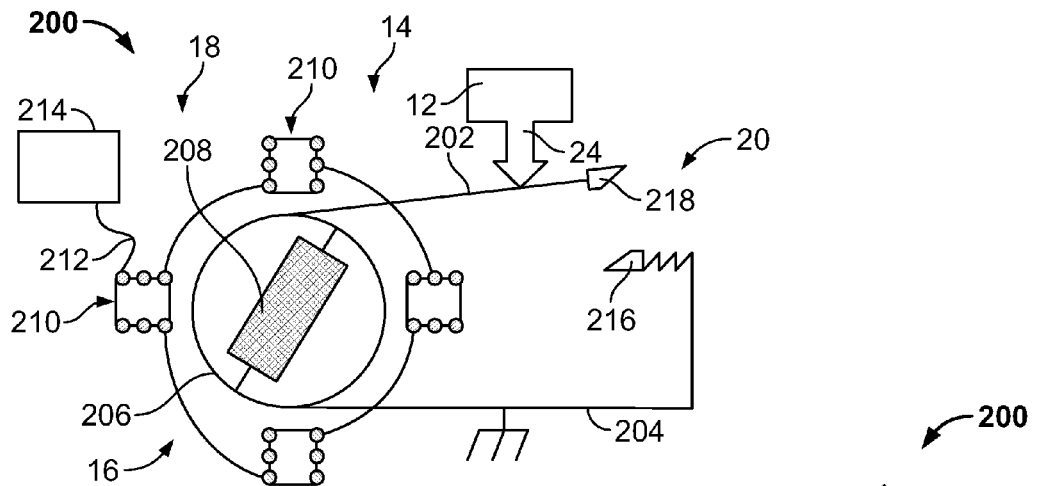
FIG. 14 is a cross-sectional side view of a rotational harvester, showing an input force pushing down a receiver and deforming an energy collector with an input displacement.
Figure 15:
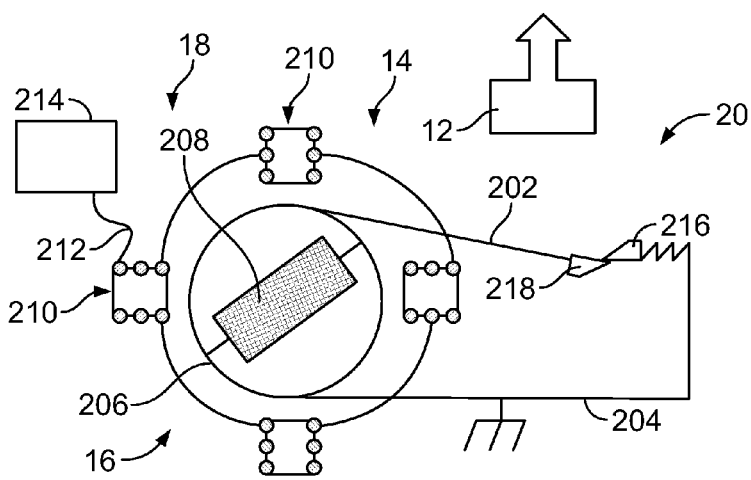
FIG. 15 is a cross-sectional side view of the rotational harvester from FIG. 14, showing the input force acting in a opposite direction and showing a holder engaged and locking the energy collector in a catch position.
Figure 16:
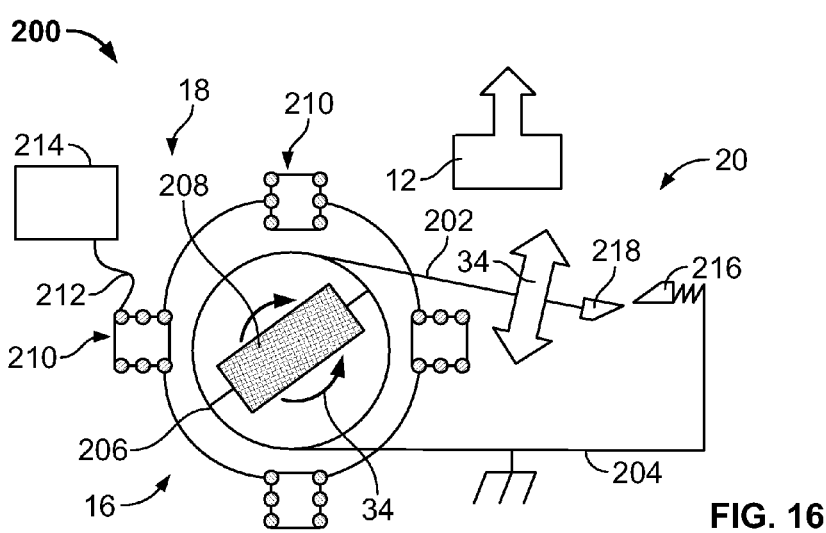
FIG. 16 is a cross-sectional side view of the rotational harvester from FIG. 14, showing the input force acting in an opposite direction and showing the holder released and the energy collector moving with a output displacement.
Figure 17:
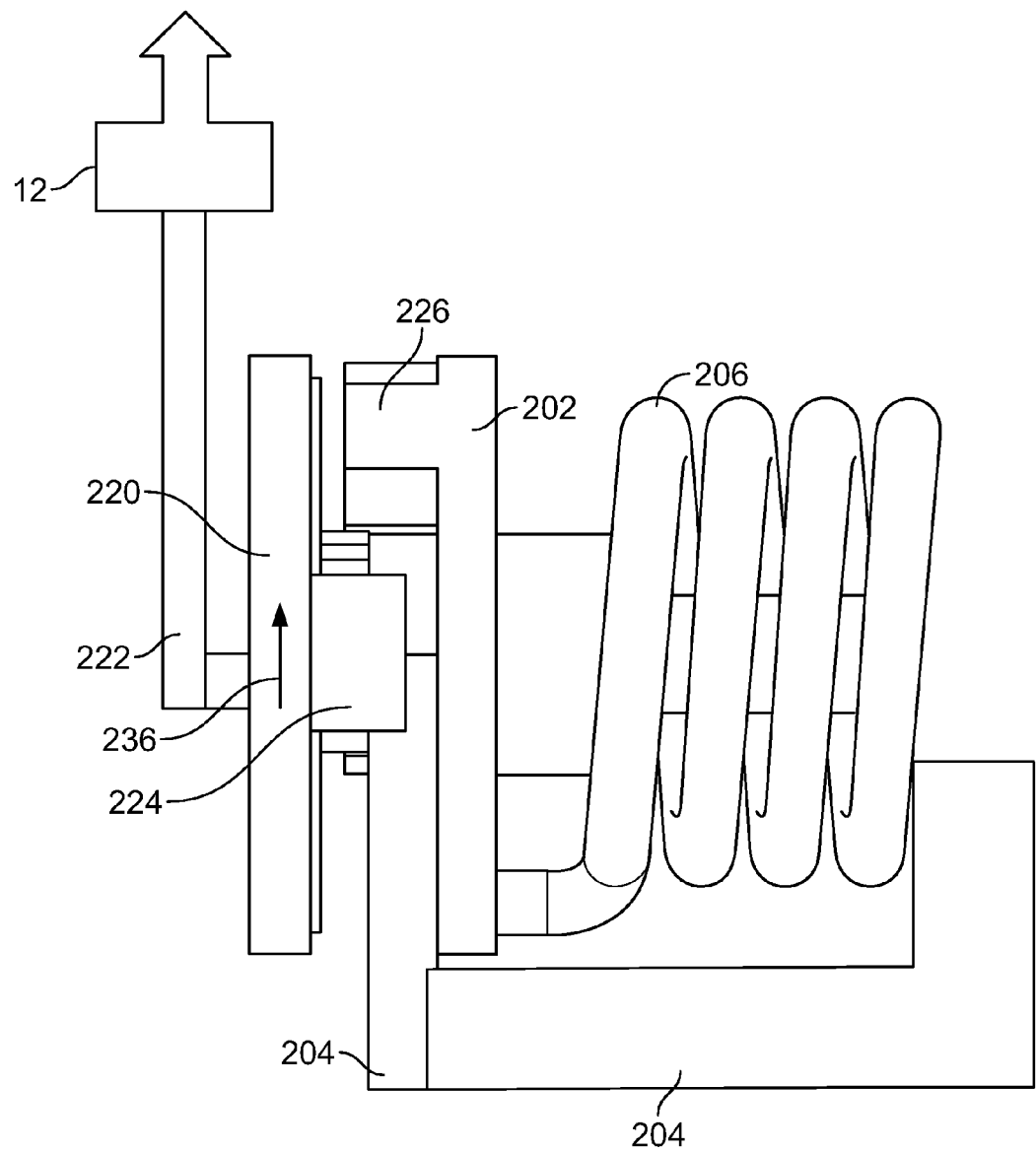
FIG. 17 is a side view of a specific rotational harvester, showing the input force pulling up on a crankshaft to rotate an input disc in an input direction to engage to the receiver and deform the energy collector without showing the coil or generator for illustrative purposes.

The rotational harvester 200 receives a rotational movement and is shown in a basic form in FIGS. 14-16 and is shown in a specific embodiment in FIGS. 17-20. One of ordinary skill in the art can appreciate that many other embodiments are possible in accordance with the present disclosure. The receiver 14 of the rotational harvester 200 includes an extension 202 and a base 204. The rotational harvester's 200 energy collector 16 comprises a torsion spring 206. One end of the torsion spring 206 is connected to the base 204 and the other end is connected to the extension 202.

The converter 18 of the rotational harvester 200 is shown to include a magnet 208, coils 210, circuit 212, and an electrical energy storage device 214. The magnet 208 is suspended in the interior of the torsion spring 206. In another embodiment the magnet 208 is formed around the exterior surface of the torsion spring 206. The coils 210 are located around the exterior of the torsion spring 206 and are electronically connected. The circuit 212 is electronically connected to the coils 210, which is connected to the electrical energy storage device 214. The electrical energy storage device 214 can include power conditioning electronics and can include a capacitor, battery, or other device capable of receiving, storing, and releasing electric energy.

The rotational harvester's 200 holder 20 includes a latch 216 and catch 218. The latch 216 is connected, or formed as part of, the base 204. The catch 218 is connected to the extension 202.

During the input stage 22, as seen in FIG. 14, the input force 12 pushes downward on the extension 202 and latch 216 winds the torsion spring 206. The energy collector 16 and magnet 208 moves with the input displacement 24 seen in FIG. 4. The input force 12 continues to push until the catch 218 is underneath the latch 216.

Next, is the hold stage 28. The input force 12 reverses direction, as seen in FIG. 15. The receiver 14, energy collector 16, and magnet 208 are held in the catch position 28 and have a constant displacement, as graphically shown in FIG. 4. Accordingly, torsion spring 206 is held in a wound position and stores energy.

Once the input force 12 changes direction or has caused the receiver to move a sufficient distance, the output stage 32 begins. The catch 218 is released from the latch 216 and the torsion spring 206 is accordingly released, as seen in FIG. 16. The torsion spring 206 is displaced and vibrates with the output displacement 34, as graphically shown in FIG. 4. The magnet 208 moves with the torsion spring 206 and electricity is produced in the coils 210 through magnetic induction. The circuit 212 delivers the electricity to the electrical energy storage device 214 or to an electricity-consuming device or power grid.

FIGS. 17-20 show a specific embodiment of the rotational harvester 200. The receiver 14 is shown to include an input disc 220 to create rotational movement from input force 12 through a crankshaft 222. The extension 202 is also shown to be formed in the shape of a disc. The input disc 220 has an input block 224 configured to interact with an extension block 226 on the extension 202.

Ramp 228 is located on the inside of the input disc 220 to interact with a ramp lobe 230 of latch 216 which is connected to the base 204. The catch 218 is comprised of laddered teeth 232 located along the outer periphery and on the inside of extension 202. The latch 216 is biased so that the engagement lobe 234 of latch 216 interacts with laddered teeth 232. The biasing of latch 216 can be achieved in a number of ways. In one embodiment the biasing is achieved by weight distribution and in another embodiment by a spring.

Figure 18:
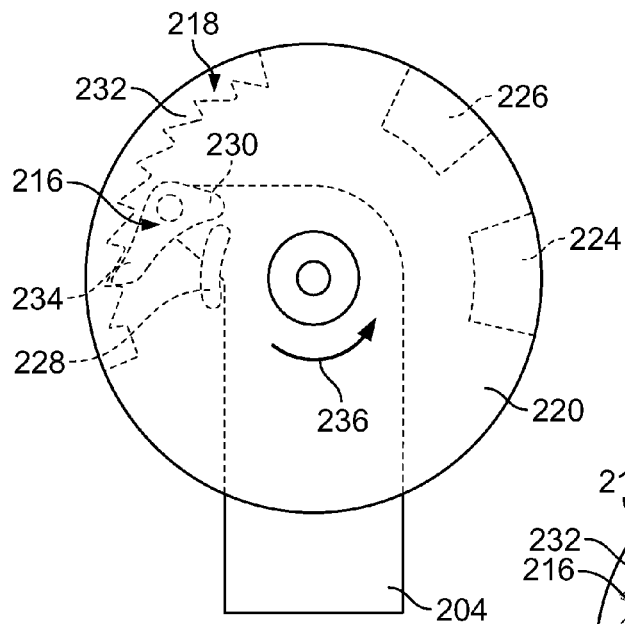
FIG. 18 is a cross-sectional front view of the rotational harvester from FIG. 17, showing the holder to include a catch and latch and showing the catch moving over the latch as the receiver moves in the input direction.
Figure 19:
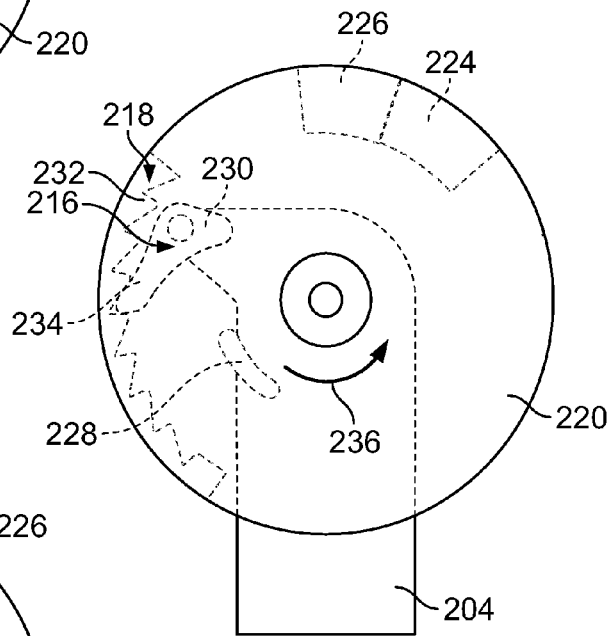
FIG. 19 is a cross-sectional front view of the rotational harvester from FIG. 17, showing an input block pushing a receiver block as the input disc moves in the input direction.

During the input stage 22, the input disc 220 is rotated in input direction 236. Extension lobe 234 of latch 216 moves over the laddered teeth 232 as the input disc 220 rotates, allowing the extension 202 to rotate with the input disk 220 but to not counter rotate, as seen in FIGS. 18 and 19. The input block 224 then pushes extension block 226 to move torsion spring 206 in a radial direction with the input displacement 24, storing energy. The multiple laddered teeth 232 account for different distances of radial travel by the receiver 14 while maximizing the amount of energy stored.

Figure 20:
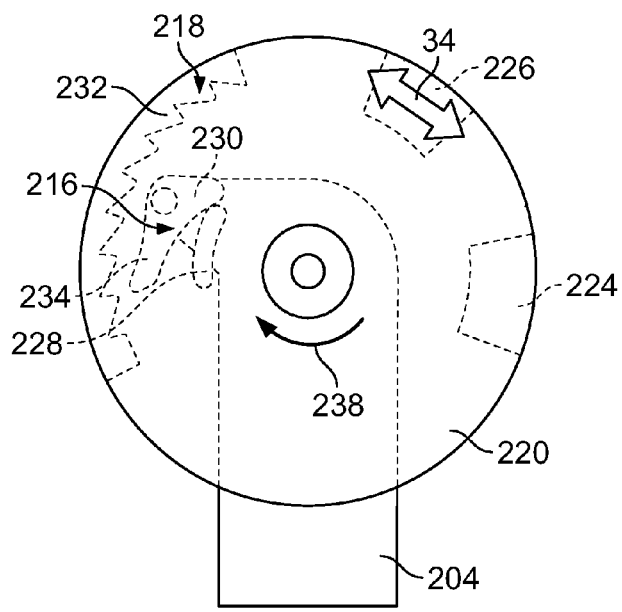
FIG. 20 is a cross-sectional front view of the rotational harvester from FIG. 17, showing the input disc moving in a retreat direction and a ramp disengaging the latch from the catch, releasing the holder and allowing the energy collector to move with the output displacement.

During the hold stage, the input disc 220 changes direction and moves in the retreat direction 238. The torsion spring 206 is now held in the catch position 26. After the input disc 220 has moved a sufficient, predetermined, distance such that the input block 224 will not interfere with the extension block 226, the ramp 228 makes contact with the ramp lobe 230 of the latch 216, causing the latch 216 to pivot. The extension lobe 234 accordingly moves downward and no longer interacts with catch 218 as seen in FIG. 20. The torsion spring 206 is accordingly released and vibrates with the output displacement 34, as seen in FIG. 20 and graphically shown in FIG. 4.

In another embodiment, not illustrated, the rotational harvester 200 does not utilize a torsion spring 206. The rotational movement is converted to a linear motion by a screw, cam, or other conventional mechanism and deforms a linear spring or other energy collector 16.

Figure 21:
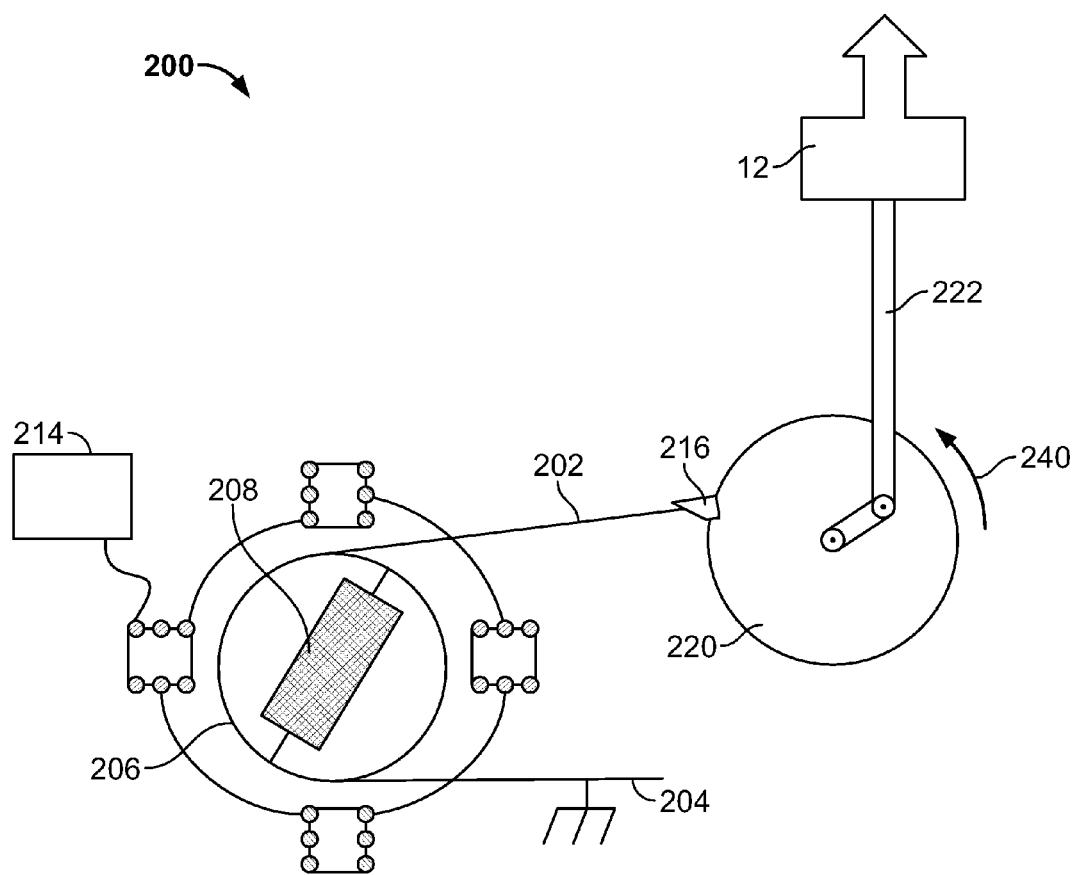
FIG. 21 is a cross-sectional front view of a rotational harvester, showing an input disc deflecting a receiver and moving an energy collector with an input displacement, the input disc can then move away to allow an energy collector to move with the output displacement.

In other embodiments, the constant displacement 30 is not involved. For example, a change in direction of input force 12 may trigger the release of holder 20, as seen in FIG. 21. The input force 12 drives crankshaft 222 and input disc 220 such that input disc 220 continuously rotates in the same rotation direction 240. Extending from the input wheel is catch 216. As the input disc 220 rotates so that catch 216 makes contact with and moves extension 202 and energy is imparted in the torsion spring 206. At some point in the motion of the catch 216, it displaces out of contact with extension 202, and the torsion spring 206 and a magnet 208 vibrate with the output displacement 34. This embodiment can also be adapted to the linear harvester 100 whereby the catch 216 makes contact with and pushes down directly on magnet 112. Multiple energy harvesters can also be placed around the input disc 220 such that a single catch 216 makes contact with multiple extensions 202 during each rotation.

Various embodiments of the present disclosure can be used in arrays, or in conjunction with one another, to increase the overall power output. For example, multiple spring and magnet systems or multiple energy storage and power generation components can be set up in an array.

Energy harvester 10 can be used to power a wide range of applications, for example, powering remote transmitting stations, powering remote monitoring stations, powering autonomous vehicles, providing commercial power, providing power on board mobile vehicles, providing off grid power, powering consumer electronics, etc.

The energy harvester 10 can also be used to power Microelectromechanical Systems (MEMS) or Nanoelectromechanical Systems (NEMS) or other machines and devices that are very small. In these MEMS and NEMS applications, the size of the energy harvester 10 and its components are, in one example, between 10 nanometers to 500 microns. The size of the energy harvester 10 is adjusted to meet the needs of the application and is not limited.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure.

The invention claimed is:

1. An energy harvester comprising:
   an energy collector secured to a base to store and release energy that accepts input from a receiver and that responds to a holder controlling output, said energy collector having an inherent output speed and an inherent output frequency,
   a receiver for receiving an input force and deforming the energy collector to a catch position according to an input displacement wherein the receiver travels with a rotational motion,
   a holder for temporarily holding the energy collector in the catch position with a constant displacement and releasing the energy collector from the catch position, said selective release being controlled in such a manner that the energy collector moves with an output displacement speed higher than the input displacement speed, that output displacement speed being governed primarily by said collector's inherent output speed and frequency, and
   a converter for transforming the rotational motion of the energy collector into electric energy.

2. The energy harvester from claim 1, wherein the output displacement has a higher frequency than a frequency of the input displacement.

3. The energy harvester of claim 2, wherein a ratio of the frequency of the input displacement to the frequency of the output displacement is greater than approximately 1:10.

4. The energy harvester of claim 1, wherein the output displacement has higher top speed than a top speed of the input displacement.

5. The energy harvester of claim 4, wherein the top speed of the input displacement to the top speed of the output displacement is greater than approximately 1:10.

6. The energy harvester of claim 1, wherein the energy collector includes a torsion spring.

7. The energy harvester of claim 1, wherein the receiver moves away form the energy collector while the holder is holding the energy collector.

8. The energy harvester of claim 1, wherein the receiver travels with a rotational motion.

9. The energy harvester of claim 1, wherein the receiver includes an input disc.

10. The energy harvester of claim 1, wherein the converter uses magnetic induction.

11. The energy harvester of claim 10, wherein the converter includes a magnet attached to the energy collector.

12. The energy harvester of claim 11, wherein the converter includes a coil.

13. The energy harvester of claim 1, wherein the converter includes a piezoelectric material.

14. The energy harvester of claim 1, wherein the receiver and input force do not impede the output displacement of the energy collector.

15. A method for harvesting energy comprising:
   deforming at an input displacement an energy collector by an input force and a rotational motion,
   capturing the energy collector for a period of time at a constant displacement,
   releasing the energy collector at an output displacement said energy collector having an inherent output speed and an inherent output frequency, and
   converting the rotational motion of the energy collector into electric energy.

16. A method for harvesting energy comprising:
   an input stage during which a energy collector, said energy collector having an inherent output speed and an inherent output frequency, is deformed by an input force and a rotational motion,
   a hold stage during which the energy collector is held and the input force changes direction, and
   an output stage during which the energy collector is released and a output displacement of the energy collector is converted to electricity, that output displacement being governed primarily by said collector's inherent output speed and frequency.

\* \* \* \* \*